June 13, 1961

A. F. FAIRBANKS ET AL 2,988,456

SLIP-CAST CERAMIC BASE OPTICAL MIRRORS

Filed Feb. 14, 1958

INVENTORS.
AVARD F. FAIRBANKS
STEPHEN E. JOHNSTON
BY
Robert H. Fraser
ATTORNEY

June 13, 1961  A. F. FAIRBANKS ET AL  2,988,456
SLIP-CAST CERAMIC BASE OPTICAL MIRRORS
Filed Feb. 14, 1958  2 Sheets-Sheet 2
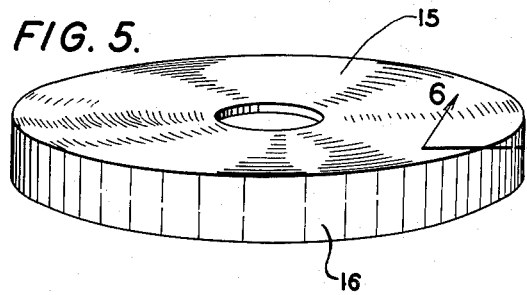
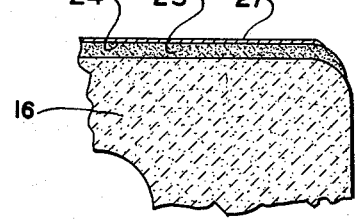
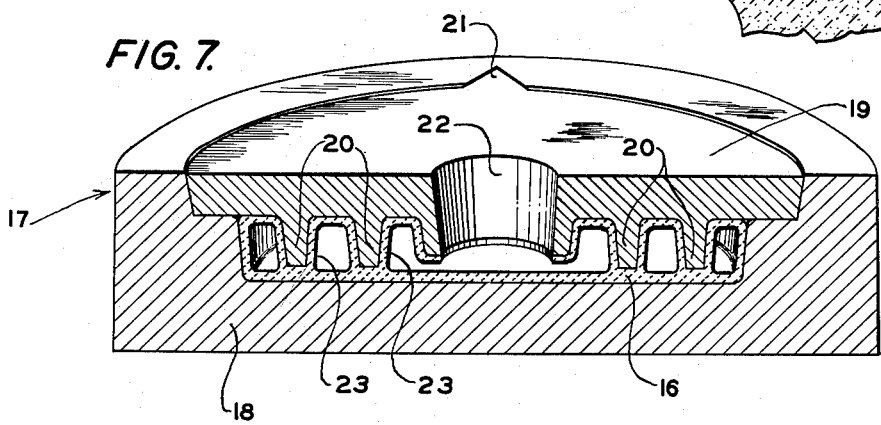
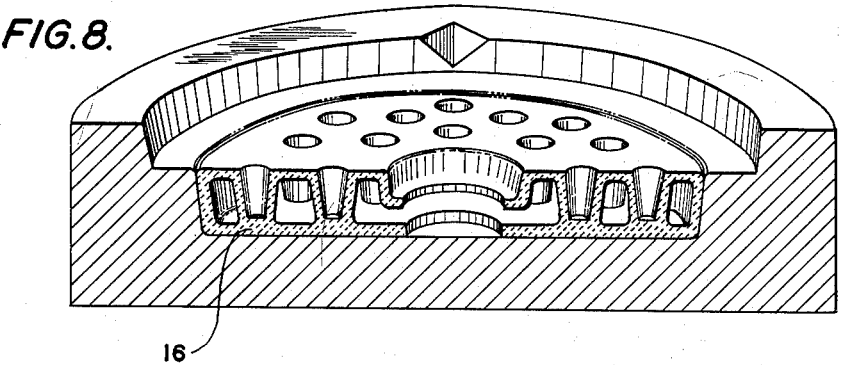
INVENTORS.
AVARD F. FAIRBANKS
STEPHEN E. JOHNSTON
BY Robert H. Fraser
ATTORNEY United States Patent Office 2,988,456
Patented June 13, 1961

2,988,456
SLIP-CAST CERAMIC BASE OPTICAL MIRRORS
Avard F. Fairbanks, Hawthorne, and Stephen E. Johnston, Manhattan Beach, Calif., assignors, by mesne assignments, to Thompson Ramo Wooldridge Inc., Cleveland, Ohio, a corporation of Ohio
Filed Feb. 14, 1958, Ser. No. 715,379
9 Claims. (Cl. 117—35)

This invention relates to optical mirrors and an improved method of manufacturing optical mirrors. More particularly the invention relates to an optical mirror including a ceramic base having a high density surface upon which is deposited a reflective layer and the method of manufacturing an optical mirror in which ceramic materials are processed to form a base having a high density surface upon which is deposited a reflective coating.

In optical systems it is well known to employ a mirror which is shaped in a predetermined configuration. For example, the telescope at Mt. Palomar, California, includes as an optical element a 200 inch parabolic mirror comprising a honeycombed glass base upon which there is deposited a reflective coating. Although the Mt. Palomar telescope employs a very large mirror which is extremely heavy, other types of optical equipment use similar mirrors of smaller sizes.

Due to the optical requirements for stability and precision of the reflecting surface, the dimensional accuracy, surface smoothness and stability of the base for supporting the reflective layer must be extremely good. Although glass meets the requirements of surface smoothness if properly ground and polished, a base constructed entirely of glass tends to be quite heavy, and where the mirror must be moved in its location a heavy base is a great disadvantage since a complex and large mechanism for positioning the mirror is required.

Another difficulty encountered in the use of known base materials to support a reflective coating in forming an optical mirror is that the materials generally expand and contract with temperature. The change in size of the base causes a distortion in the reflective coating, with the result that the optical system produces an image which is defocused or distorted.

Due to the dimensional stability of ceramic materials, attempts have been made to form a suitable mirror base by conventional clay forming techniques. However, because of porosity of known ceramic materials, the required degree of smoothness of the reflective layer supporting surface has not been achieved. Nor does an application of a coating of glaze to the surface overcome the problem since the glaze includes bubbles and voids which appear when an attempt is made to grind and polish the surface to achieve a selected optical configuration. In addition, the glaze tends to craze or crack with temperature changes.

From the above it is apparent that there is a need for an optical mirror which may be constructed by a simple process having a relatively high strength and low weight, while at the same time having a surface which is sufficiently smooth to support a reflective coating and which has a substantially zero temperature coefficient.

Accordingly, it is an object of the present invention to provide a new and improved optical mirror having a ceramic base.

It is another object of the present invention to provide a new and improved method for manufacturing a ceramic base for use as an optical mirror element.

It is yet another object of the present invention to provide a new and improved optical mirror base having a surface which is substantially denser than the remainder of the base.

It is still another object of the invention to provide a simple and inexpensive process for manufacturing optical mirrors having superior characteristics.

Briefly, in accordance with the invention, ceramic materials are ground to a particle size having a maximum dimension less than 20 microns, a slip is prepared by mixing the ground ceramic materials with water, a base is formed by casting the slip into a porous plaster mold, the material of one surface of the base is retarded in drying, the formed base is fired, the surface which was retarded in its drying is ground and polished, and a reflecting coating is deposited on that surface.

Due to the special grinding of the materials making up the slip and the retarding of the drying of the surface during its manufacture, the surface which was retarded in drying shrinks to a density greater than may be achieved by conventional ceramic casting methods. The density is increased because the finer particles resulting from the special grinding compact under shrinkage and retarded drying to a greater degree than do larger ceramic particles in a conventional slip mixture normally cast in a porous mold.

In a particular optical mirror produced in accordance with the invention, the base comprises a structure having a surface which is substantially denser than the remainder of the structure. The dense surface is polished and a reflective coating deposited thereon which functions as an optical mirror.

A better understanding of the invention may be had from a reading of the following detailed description and an inspection of the drawings, in which:

FIG. 5 is a perspective view of another optical mirror in accordance with the invention;

FIG. 6 is an enlarged fragmentary sectional elevation taken along line 6—6 of FIG. 5;

FIG. 7 is a perspective view, partly broken away, of a two-part mold for use in accordance with the invention; and FIG. 8 is a perspective view, partly broken away, of the bottom section of the mold of FIG. 7 containing a cast base.

Figure 1:
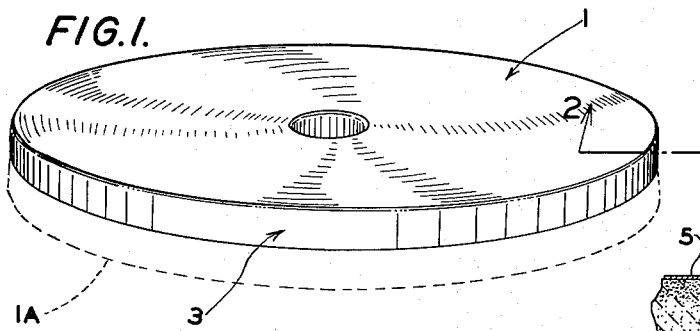
FIG. 1 is a perspective view of an embodiment of an optical mirror in accordance with the invention.
Figure 2:
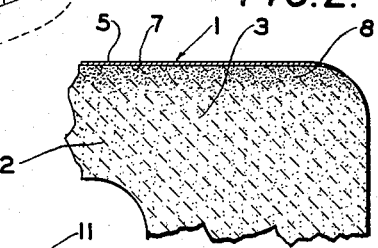
FIG. 2 is an enlarged fragmentary sectional elevation taken along line 2—2 of FIG. 1.
Figure 4:
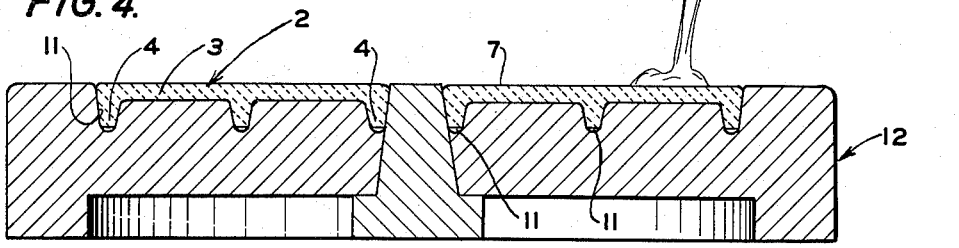
FIG. 4 is a sectional elevation of the mold of FIG. 3 in use.

An exemplary optical mirror 1 in accordance with the invention is shown in FIGS. 1, 2 and 4. The optical mirror 1 comprises a ceramic base 2 including a disk 3 formed integrally with a plurality of strengthening ribs 4.

As illustrated in FIG. 2, a reflective coating 5 is deposited on the top surface 7 of the disk 3. A dense region 8 at the surface of the disk 3 may be formed in accordance with the process of the invention so that the surface may be ground and polished to a selected optical configuration. By joining a pair of similar ceramic bases together as indicated by the dashed line 1A in FIG. 1, the overall strength of the mirror may be increased.

In the improved method of manufacturing optical mirrors in accordance with the invention, ceramic clay materials are ground to a very small particle size which we have found to be preferably less than 20 microns maximum dimension. The materials are ground until they all pass a 400 mesh screen, or preferably a 1000 mesh screen. The ceramic materials are then mixed with water to give a workable casting mixture or slip. The various proportions of the ceramic materials may be adjusted to control the temperature coefficient of the resultant ceramic base.

For example, the materials may include the oxides of silica, alumina, magnesium, lithium, potassium or other silicates common to the ceramic industry. An example of one workable mixture of colloidal clay, china clay and feldspar is as follows:

| | Percent |
|---|---|
| Colloidal clay | 15 |
| Typical analysis— | |
| 54% $SiO_2$ | |
| 29% $Al_2O_3$ | |
| China clay | 25 |
| Typical analysis— | |
| 45% $SiO_2$ | |
| 38% $Al_2O_3$ | |
| Feldspar | 60 |
| Typical analysis— | |
| 59.3% $SiO_2$ | |
| 24.7% $Al_2O_3$ | |
| 5% $K_2O$ | |

However, a mixture of 90% lithium aluminum silicate and 10% feldspar gives a negative temperature coefficient which may be desirable for some uses. By adjusting the amount of lithium aluminum silicate in combination with other ceramic materials, a zero temperature coefficient base may be achieved.

Figure 3:
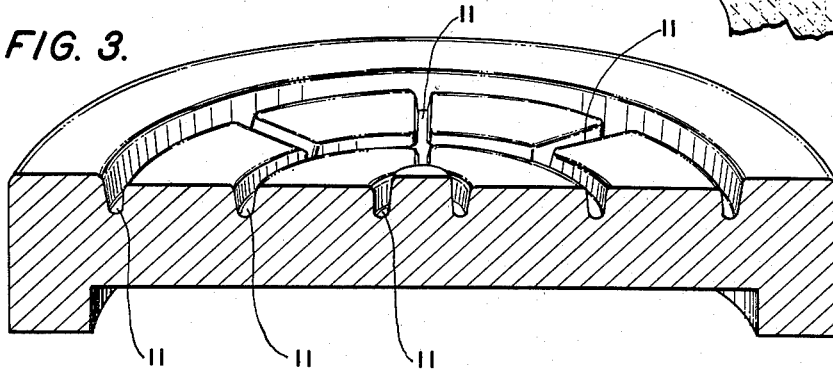
FIG. 3 is a perspective view, partly broken away, of a porous mold for use in accordance with the invention.

After the slip has been prepared it may be cast in a plaster of Paris mold, such as that illustrated in FIGS. 3 and 4. Thus, as in FIG. 4, the slip is poured from a container 10 into the recesses 11 of a mold 12 which is formed to produce a ceramic base having a ribbed back. The cast slip is then allowed to stand for a period known as the settling time, during which the plaster of Paris mold 12 draws off moisture from the cast slip. However, in the molds of FIGS. 3 and 4, upper surface 7 of the cast base does not contact the plaster of Paris mold but is allowed to dry in contact with the air. Accordingly, the drying of the surface is retarded as compared to the drying of the portion in contact with the mold.

We have found that by retarding the drying of the selected surface upon which a reflective coating is to be placed, the shrinkage in the surface layer is substantially increased with a consequent increase in the density of the material. At the end of the settling period, the cast base may be removed from the mold and, although fragile, may be transferred to a kiln for firing. Due to the large amount of shrinkage appearing where the clay particles are ground finely and the drying is retarded in accordance with the invention, the mold 12 is preferably divisible in sections so as to be separated to remove the cast base from the mold without damage.

After the cast base is transferred to a kiln, the base may be fired to a vitreous condition, as for example, by maintaining the kiln at a temperature of 2400° F. for 12 hours. During the firing, additional shrinkage takes place causing a compression of the particles so that after partial fusion in the firing process an extremely dense material results. We have found that the aforesaid controlled conditions produce a material of such density and uniformity that the material may be ground and polished with a high degree of precision to receive an evaporated metal film 5 which functions as an optical mirror. The smoothness of the resulting surface exceeds that which is possible of attainment by known techniques. For example, as noted above, attempts have been made to place a porcelain glaze on ceramic bases of materials of ordinary particle size prepared in the usual fashion. The result has been unsatisfactory since gas bubbles, and cracks in the glaze, produce discontinuities in the surface which appear when the surface is polished.

FIGS. 5–8 illustrate an optical mirror 15 constructed in accordance with the invention having a hollow ceramic base 16 which is slip cast in a two-piece mold. Thus, in FIG. 7, a mold 17 has a bottom portion 18 which has a configuration corresponding to the optical surface of the mirror. A separable top portion 19 includes a plurality of cores 20 extending downwardly. When the top and bottom portions of the mold 17 are placed together a key 21 holds the two halves in accurate alignment.

The slip may be poured into the mold through a hole 22 in the top section. The mold may then be agitated to be sure that the slip engages the walls of the mold and the cores. As the plaster of Paris draws moisture from the slip, a layer 23 of clay is built up on the cores and surfaces of the mold as indicated. After the clay layer has reached a desired thickness, the excess slip may be poured off through the hole 22 in the top section by inverting the mold.

FIG. 8 illustrates the bottom half 18 of the mold partially broken away to show the honeycombed structure of a cast base 16 formed by the cores of the top section of the mold. After the cast base 16 is carefully removed from the mold, a separate surface layer 25 of finely ground slip material is applied to the base 16 and allowed to dry in contact with the air. Therefore, the drying of the surface layer 25 is retarded as compared with the drying of the remainder of the ceramic base 26 in the plaster of Paris mold. Accordingly, as described above in connection with FIGS. 1–3, the layer 25 shrinks to a density after firing greater than the remainder of the ceramic base 16. As before, the cast ceramic base 16 with the extra layer 25 of slip on the optical surface may be placed in a kiln for firing at a suitable temperature such as 2400° F. for a period of 12 hours, after which the optical surface may be ground and polished to produce a smooth surface for receiving an evaporated metal film 27 which functions as an optical mirror (FIGS. 5 and 6).

While the process of the invention has been described as utilizing molds of plaster of Paris, other casting form materials can be used so long as the layer adjacent the reflective layer supporting surface is retarded in drying.

From the above it is apparent that the mirror of the invention combines the characteristics of lightness, strength, and dimensional stability without sacrifice in smoothness of the surface to be optically coated, and the process of the invention achieves an optical mirror of superior characteristics with a minimum of expense and a high degree of precision.

What is claimed is:

1. The process for making an optical mirror having a ceramic base including the steps of grinding a ceramic clay material to a particle size less than 20 microns, mixing the ground material with water to form a slip, pouring the slip into a moisture absorbing mold in which a surface of the poured slip is exposed to the air to retard the removal of moisture from the slip in the surface area during settling of the clay, removing the mold from the settled clay, firing the clay to a vitreous condition, grinding the surface which was retarded in drying to a selected configuration, and depositing a reflective coating on the ground and polished surface to form an optical mirror having a configuration corresponding to the ground and polished surface.

2. The process for making an optical mirror including the steps of slip casting a ceramic material in a moisture absorbing mold with a selected surface of the cast slip being exposed to the air during the settling period for retarding the removal of moisture, firing the ceramic material to a vitreous condition, grinding and polishing the selected surface of the ceramic material to a predetermined configuration, and depositing a reflective coating on the selected surface to provide an optical mirror having a predetermined optical characteristic.

3. The process for making optical mirrors including in combination the steps of slip casting a base for the mirror, applying a layer of a material having a particle dimension less than 20 microns to a selected surface of the base, retarding the drying of the applied layer, firing the base and the layer to a vitreous condition, grinding and polishing the applied layer to a predetermined configuration, and depositing a reflective coating on the applied layer to form an optical mirror having a predetermined configuration.

4. The process for making optical mirrors including the steps of grinding a clay material which is primarily lithium aluminum silicate to a particle dimension less than 20 microns, mixing the ground material with water to form a slip, slip casting the ground material by pouring the slip into a plaster of Paris mold to form a base, retarding the removal of water from a selected surface of the base, removing the plaster of Paris mold from the base after a predetermined settling period, firing the cast base to a vitreous condition, polishing and grinding the selected surface which was retarded in drying to a predetermined configuration, and coating the polished and ground surface with a reflective layer to produce an optical mirror having a substantially zero temperature coefficient.

5. The process for making optical mirrors including the steps of preparing a porous plaster mold corresponding to the spatial configuration of a base, slip casting ceramic materials having maximum particle dimensions less than 20 microns into the mold, applying a layer of ceramic materials having a particle dimension less than 20 microns to a surface of the cast base, retarding the drying of the ceramic materials to produce a surface layer having a density greater than the density of the remainder of the base, firing the base and the surface layer to a vitreous condition in which the density of the material of the surface layer is substantially greater than the density of the remainder of the material, grinding and polishing the surface layer to a given optical configuration, and depositing a reflective coating on the ground and polished surface to produce an optical mirror.

6. An optical mirror comprising a ceramic base having a surface layer substantially denser than the remainder of the base, said surface layer being formed in a predetermined configuration, and a layer of reflective material supported by the surface layer to form an optical mirror having an optical characteristic in accordance with the configuration of the surface layer.

7. The process for making an optical mirror having a ceramic base including the steps of finely grinding ceramic clay materials, mixing the ground materials with a liquid to form a slip, casting the slip in a moisture absorbing mold to form a base, withdrawing the liquid from a selected surface layer of the cast base at a slower rate than the rate of withdrawal by the moisture absorbing mold to increase the density of said selected layer, firing the cast base to a vitreous condition, and depositing a reflective layer on said selected surface layer to form an optical mirror having an optical characteristic in accordance with the configuration of said selected surface layer.

8. The process for making an optical mirror having a ceramic base including the steps of finely grinding ceramic clay materials, mixing the ground materials with a liquid to form a slip, casting the slip in a moisture absorbing mold to form a base, withdrawing the liquid from a selected surface layer of the cast base at a slower rate than the rate of withdrawal by the moisture absorbing mold whereby the density of the selected surface layer is increased, firing the cast base to a vitreous condition, polishing the surface layer to a selected configuration, and depositing a reflective layer on said selected surface layer of the base to form a mirror having an optical characteristic corresponding to the configuration of the polished surface layer of the base.

9. The process for making a ceramic base for an optical mirror in which a reflective layer supporting surface comprises a substantially higher density material than the remainder of the base including the steps of grinding a mixture of clay materials until substantially all the particles of the material have a maximum dimension less than 20 microns, preparing a slip by mixing the ground materials with a liquid, slip casting the base by pouring the slip into a moisture absorbing mold with a selected surface of the base being retarded in drying during a period of settling, removing the base from the mold after settling, firing the base to a vitreous condition in which the surface which was retarded in drying experiences a degree of shrinkage greater than the remainder of the base so as to be substantially more dense than the remainder of the base, grinding and polishing the higher density surface of the base to a predetermined configuration, and depositing a reflective layer on the ground and polished surface to provide an optical mirror having an optical characteristic in accordance with the configuration of said ground and polished surface.

References Cited in the file of this patent

UNITED STATES PATENTS

| | | |
|---|---|---|
| 163,930 | Huber | June 1, 1875 |
| 418,136 | Koyl | Dec. 24, 1889 |
| 1,630,762 | Randall | May 31, 1927 |
| 1,692,887 | Casselman | Nov. 27, 1928 |
| 1,694,563 | Ross et al. | Dec. 11, 1928 |
| 2,053,923 | Stewart | Sept. 8, 1936 |
| 2,358,211 | Christensen et al. | Sept. 12, 1944 |
| 2,463,404 | McKinley | Mar. 1, 1949 |
| 2,466,001 | Burwell | Apr. 5, 1949 |
| 2,582,993 | Howatt | Jan. 22, 1952 |
| 2,647,068 | Patai | July 28, 1953 |
| 2,789,338 | Armstrong et al. | Apr. 23, 1957 |

OTHER REFERENCES

Monack: "Metallizing Glass and Ceramic Materials," The Glass Industry, January 1947. (Copy in 88–105.)

"Refractories" by F. H. Norton, 1931, pages 107 and 108.